US012780557B2

(12) United States Patent
Nägele

(10) Patent No.: US 12,780,557 B2
(45) Date of Patent: Nov. 3, 2026

(54) CONVEYOR DEVICE FOR A MATERIAL PROCESSING PLANT

(71) Applicant: Kleemann GmbH, Göppingen (DE)

(72) Inventor: Florian Nägele, Hüttisheim (DE)

(73) Assignee: Kleemann GmbH, Göppingen (DE)

( * ) Notice: Subject to any disclaimer, the term of this patent is extended or adjusted under 35 U.S.C. 154(b) by 94 days.

(21) Appl. No.: 19/038,338

(22) Filed: Jan. 27, 2025

(65) Prior Publication Data

US 2025/0270050 A1 Aug. 28, 2025

(30) Foreign Application Priority Data

Feb. 22, 2024 (DE) .................... 10 2024 105 022.5

(51) Int. Cl.
*B65G 27/20* (2006.01)
*B65G 27/32* (2006.01)
*H02K 7/06* (2006.01)

(52) U.S. Cl.
CPC ............. *B65G 27/20* (2013.01); *H02K 7/061* (2013.01); *B65G 2812/0312* (2013.01); *B65G 2812/0384* (2013.01)

(58) Field of Classification Search
CPC ...... B65G 11/026; B65G 27/20; B65G 27/32; B65G 2811/09; B02C 23/02; H02K 7/061
USPC .......................................................... 198/759
See application file for complete search history.

(56) References Cited

U.S. PATENT DOCUMENTS 4,688,679 A * 8/1987 Lindgren ................ B07B 13/10 209/699
6,662,953 B1 * 12/2003 Rouse .................... B65D 88/70 406/137
6,976,591 B2 * 12/2005 Reding ................... B07B 13/11 209/692
9,757,771 B2 * 9/2017 Dickinson ............... B07B 1/286
10,197,129 B2 * 2/2019 Tamlin ...................... F16F 1/37
10,946,415 B2 * 3/2021 Strobel ..................... B07B 1/42
(Continued)

FOREIGN PATENT DOCUMENTS

DE 202015001305 U1 7/2015
DE 102019115871 A1 12/2020
(Continued)

OTHER PUBLICATIONS

German Office Action for corresponding patent application No. DE 10 2024 105 022.5, dated Nov. 20, 2024, 8 pages (not prior art).

*Primary Examiner* — Douglas A Hess

(74) *Attorney, Agent, or Firm* — Lucian Wayne Beavers; Patterson Intellectual Property Law, PC

(57) ABSTRACT

A conveyor device for a material processing plant includes a material conveyor section. A support device is coupled to the conveyor section, wherein the support device bears a vibration exciter having two exciter units, wherein the exciter units, each have an exciter motor which drives at least one imbalance mass using a motor rotor, wherein a fastening section is used to fasten the exciter units to the support device for vibration transmission. To make for a structurally simple design and improved force transfer from the vibration exciter into the support device the motor stators of the two exciter motors may be interconnected by means of at least one connecting element, wherein the connecting element forms a bridging area, which bridges the distance between the motor stators.

20 Claims, 4 Drawing Sheets

(56) References Cited

U.S. PATENT DOCUMENTS

| | | | | |
|---|---|---|---|---|
| 11,117,747 | B2 | 9/2021 | Köpf et al. | |
| 11,358,801 | B2 * | 6/2022 | Svejkovsky | B65G 27/32 |
| 11,365,061 | B2 * | 6/2022 | Luckas | B65G 27/32 |
| 12,043,494 | B2 * | 7/2024 | Lawton | B65G 27/16 |
| 12,338,076 | B2 * | 6/2025 | Porro | B65G 27/08 |

FOREIGN PATENT DOCUMENTS

| | | | |
|---|---|---|---|
| DE | 202021104145 | U1 | 8/2021 |
| DE | 102021121614 | B3 | 10/2022 |

* cited by examiner

CONVEYOR DEVICE FOR A MATERIAL PROCESSING PLANT

RELATED APPLICATIONS

The present application claims priority to German patent application Ser. No. DE 10 1024 105 022.5, filed Feb. 22, 2024, which is incorporated herein by reference.

BACKGROUND OF THE DISCLOSURE

Field of the Disclosure

The disclosure relates to a conveyor device for a material processing plant having a conveyor arrangement, which forms a material conveyor section, wherein a support device is coupled to the conveyor arrangement, wherein the support device bears a vibration exciter having two exciter units, wherein the exciter units each have an exciter motor, which drives at least one imbalance mass using a motor rotor, and wherein a fastening section is used to fasten the exciter units to the support device for vibration transmission.

Description of the Prior Art

Such material processing plants are used for various purposes. They are used, for instance, to comminute and/or screen recycling material and/or rock material during processing. These machines can be used either as mobile or as stationary units. A feed unit is used to feed the material to be crushed into the material processing plant. Excavators are usually used for this purpose. The excavator places the material to be crushed or screened in the conveyor arrangement, in particular a conveyor chute, of the feed unit. Starting from the feed unit, the material to be processed is conveyed in the conveying direction along a conveyor section of the conveyor arrangement to a screener unit or crusher unit. The conveyor arrangement effectuates transportation by means of motor-driven exciter units, which are designed as vibratory exciters or eccentric vibrators. These exciter units are connected to a support device, which is connected to the feed unit. The vibration exciters cause the conveyor arrangement to vibrate via the support device such that a conveying effect is achieved in the conveying direction towards a downstream process unit, for instance a screener unit or a crusher unit.

DE 10 2019 115 871 A1 (U.S. Pat. No. 11,117,747) discloses a conveyor device for a material processing plant, in which a vibration exciter is coupled to a feed unit via a support.

Very high forces act during the machining operation, which forces have to be transferred from the vibration exciter to the support device. To transfer the forces safely, a support plate is provided in this known material processing plant, to which the exciter units are each coupled by means of a fastening section. The support plate has to be dimensioned to be very massive to permit the forces to be transferred without damage.

SUMMARY OF THE DISCLOSURE

The disclosure addresses the problem of providing a conveyor device of the type mentioned at the beginning, which makes for an improved force transfer from the vibration exciter into the support device while having a structurally simple design.

This problem is solved in that the motor stators of the two exciter motors are interconnected by means of at least one connecting element, wherein the connecting element forms a bridging section, which bridges the distance area between the motor stators.

According to the disclosure, the two exciter units are not only held at the support device by means of the fastening section. The connecting element, which uses a bridging area to connect the two motor stators, acts in addition to the fastening section. The bridging area of the connecting element is spaced apart from the fastening section(s). As a result of this coupling of the two motor stators, their relative motion to each other is prevented or at least significantly reduced. This significantly reduces the stresses in the area where the fastening section(s) is/are connected to the support device. Accordingly, this fastening point no longer has to be as massive, which makes for a lighter and more cost-effective design. In addition, this solution also increases efficiency, as, due to the coupling of the motor stators, less energy is converted into deformation work in the area of the attachment point.

According to one variant of the disclosure, provision may be made for at least one of the axes of rotation, preferably for both axes of rotation, of the motor rotors to be arranged at least sectionally in the distance area formed between the fastening section and the bridging area of the at least one connecting element. This makes for a particularly rigid design.

For a space-saving design, provision may also be made for the bridging area of the at least one connecting element to be arranged at least sectionally in the area between the axes of rotation of the motor rotors.

A particularly preferred variant of the disclosure can be such that the two axes of rotation of the motor rotors are arranged in the area between the two fastening sections. It has been shown that this design can be used to achieve a particularly good conveying effect on the conveyor line.

Preferably, provision may be made for the axes of rotation of the two exciter units to be arranged spaced apart and transversely, in particular perpendicular, to the conveying direction (V) of the conveyor section.

A possible variant of the disclosure can be such that the exciter motor of at least one of the exciter units drives two imbalance masses arranged spaced apart in the direction of the axis of rotation of the motor rotor, wherein the motor rotor is arranged at least sectionally between the two imbalance masses in the direction of the axis of rotation. This design results in a symmetric load of the exciter motor of the exciter unit for better operational reliability.

In this case, provision may preferably be made for the projection of the bridging area of the at least one connecting element in a plane accommodating the axis of rotation to be arranged at least sectionally in the area between the two imbalance masses spaced apart in the direction of the axis of rotation.

A possible variant of the disclosure can be such that the two exciter motors are electric motors, each of which independently drives the at least one imbalance mass assigned thereto. Surprisingly, it has been shown that the two exciter motors synchronize automatically without the need to couple the two motor rotors, for instance by means of a gearbox.

If provision is made for the at least one connecting element to be part of a housing, in which the two exciter motors are accommodated and held at least sectionally, then no separate housings, in which the exciter motors are individually accommodated, are required. This reduces the amount of parts and assembly work and at the same time improves the rigidity of the system. In particular, the housing can absorb the forces generated by the imbalance masses of both exciter units.

A possible variant of the disclosure can be such that the support device has two holders arranged spaced apart, between which the two exciter units are arranged at least sectionally and on which the vibration exciter is supported, preferably fastened. The two spaced-apart holders create a support distance that permits an improved transmission of the vibration motions. Because the exciter unit is coupled to both holders, the loads acting individually on each holder are reduced. In addition, the two exciter units in the area between the holders are better protected against mechanical impacts. Preferably, the two holders are arranged spaced apart and transversely, in particular perpendicular, to the conveying direction (V) of the conveyor section.

A conveyor device according to the disclosure can, for instance, be such that the two holders are designed as sheet steel parts, which are closed off by a folded edge and/or a stiffener on their area facing away from the conveyor device. Accordingly, the holders can be designed to be weight-optimized. They then also offer sufficient strength to transmit the vibration motions without deformation or at least with little deformation.

One possible variant of the disclosure can be such that several connecting elements, designed as spaced-apart ribs, are arranged between the motor stators to couple the motor stators to each other in a stable manner.

To vary and set the amplitude of the exciter frequency, provision may be made for the motor rotor of at least one exciter unit to drive two imbalance masses that can be adjusted relative to each other in the circumferential direction of the axis of rotation.

BRIEF DESCRIPTION OF THE DRAWINGS

The disclosure is explained in greater detail below based on an exemplary embodiment shown in the drawings. In the Figures.

DETAILED DESCRIPTION

Figure 1:
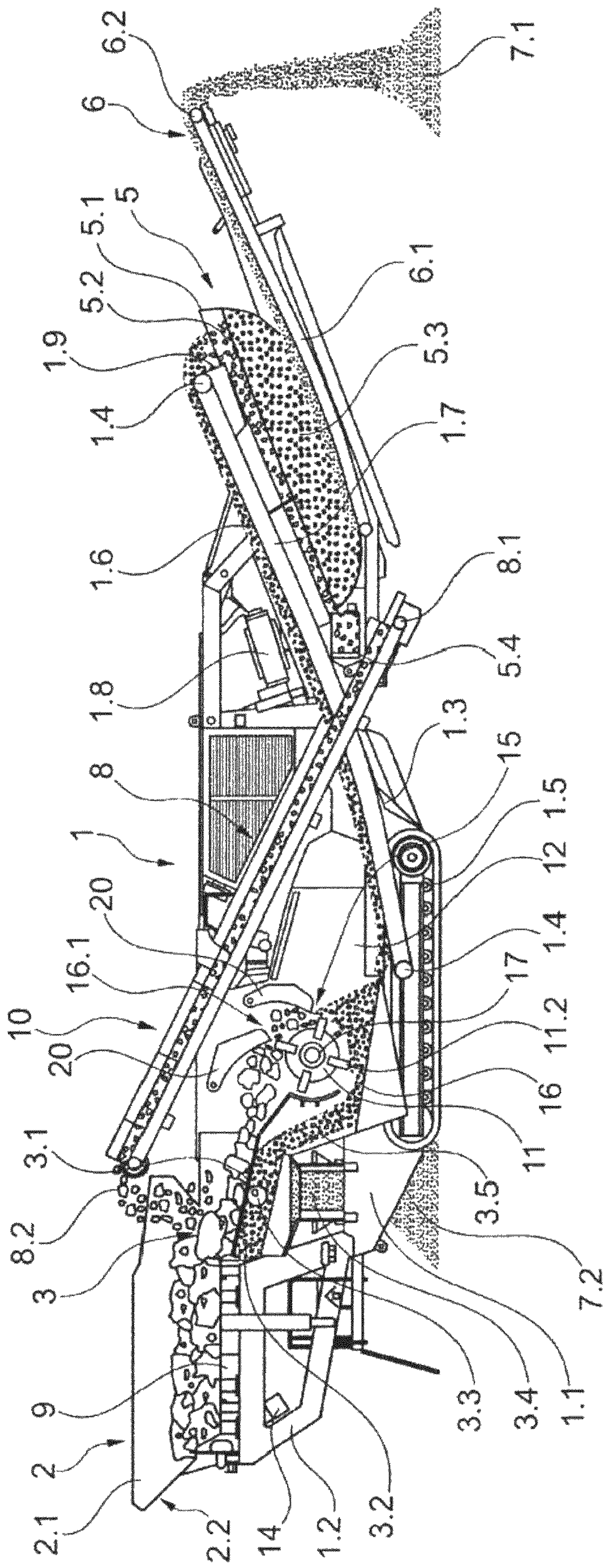
FIG. 1 shows a side view of a schematic representation of a material processing plant 1 having a crusher unit 10.

FIG. 1 shows a material processing plant 1, for instance in the form of a crushing plant, having a material processing unit, for instance in the form of a crusher unit 10.

The material processing plant 1 is designed as a mobile material processing plant 1 and therefore has travel units 1.5. However, it is also conceivable that the material processing plant 1 is a stationary material processing plant 1.

The material processing plant 1 has a chassis 1.1 that bears the machine components or at least a part of the machine components. At its rear end, the chassis 1.1 can preferably have a cantilever 1.2. A material feed area is formed in the area of the cantilever 1.2.

The material feed area can comprise a feed hopper 2 and a material feed device 9 having a conveyor device.

The feed hopper 2 may be formed at least in part by hopper walls 2.1 extending in the direction of the longitudinal extent of the material processing plant 1 and a rear wall 2.2 extending transversely to the longitudinal extent. The feed hopper 2 leads to the material feed device 9.

As shown in this exemplary embodiment, the material feed device 9 can have a conveyor device having a conveyor arrangement that forms a material conveyor section. For instance, the conveyor arrangement may have a conveyor chute.

The conveyor arrangement can be driven by a vibration drive. The vibration drive comprises a vibration exciter 14 having two exciter units 14.1, 14.2, wherein the exciter units 14.1, 14.2 each have an exciter motor 50, which drives at least one imbalance mass 53 using a motor rotor 52 (see FIGS. 6 and 7). The internal details of the exciter units 14.1 and 14.2 may be in accordance with the disclosure of the aforementioned U.S. Pat. No. 11,117,747, at FIGS. 9-11, which is incorporated herein by reference.

A support device is coupled to the conveyor arrangement, which support device bears the exciter units to transmit the vibrations of the exciter units 14.1, 14.2 to the conveyor arrangement.

The feed hopper 2 can be used to feed material to be comminuted into the material processing plant 1, for instance using a wheel loader, and to feed it onto the conveyor arrangement.

From the conveyor arrangement, the material to be comminuted passes into the area of a screen unit 3. This screen unit 3 may also be referred to as a pre-screening arrangement. At least one screen deck 3.1, 3.2 is disposed in the area of the screen unit 3. In this exemplary embodiment two screen decks 3.1, 3.2 are used.

Figure 2:
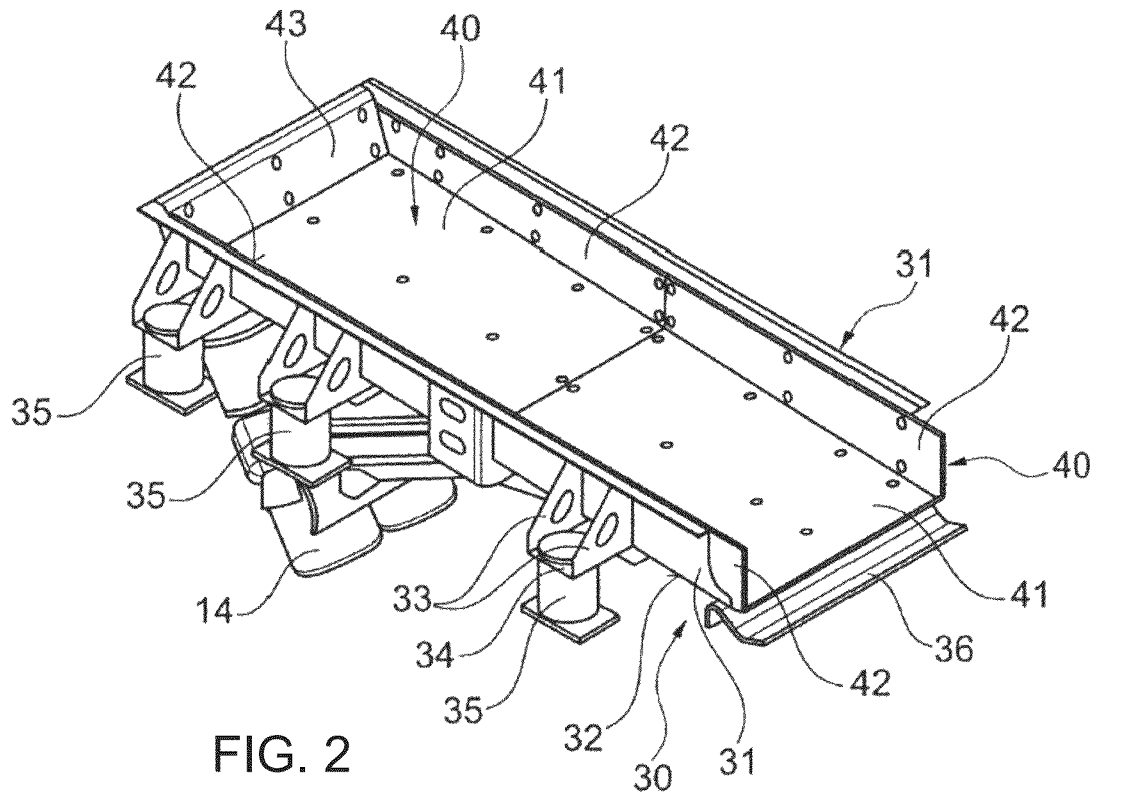
FIG. 2 shows a front view of a conveyor device of a feed unit of the mobile crushing plant of FIG. 1.

As FIG. 2 illustrates, in the material feed device 9 the conveyor chute may be located at the bottom, which conveyor chute forms a conveyor section. The material to be comminuted is conveyed to another system component, in particular to the screener unit 3, via the conveyor section.

The vibration exciter 14 is assigned to the material feed device 9. The vibration exciter 14 can be used to cause the material feed device 9 to vibrate to transport the material to be processed in the conveying direction V.

The fed material is subjected to a screening process in the screener unit 3. The plant design can be selected such that the vibration exciter 14 causes not only the material feed device 9 but also the screening unit 3 to vibrate. A transport effect in the conveying direction V is then also generated in the direction towards a crusher unit 10.

In particular, in conjunction with the inclined arrangement of the conveyor chute and/or one or more of the screen covers 3.1, 3.2, a transport effect can be achieved, as with a vibrating conveyor.

Figure 3:
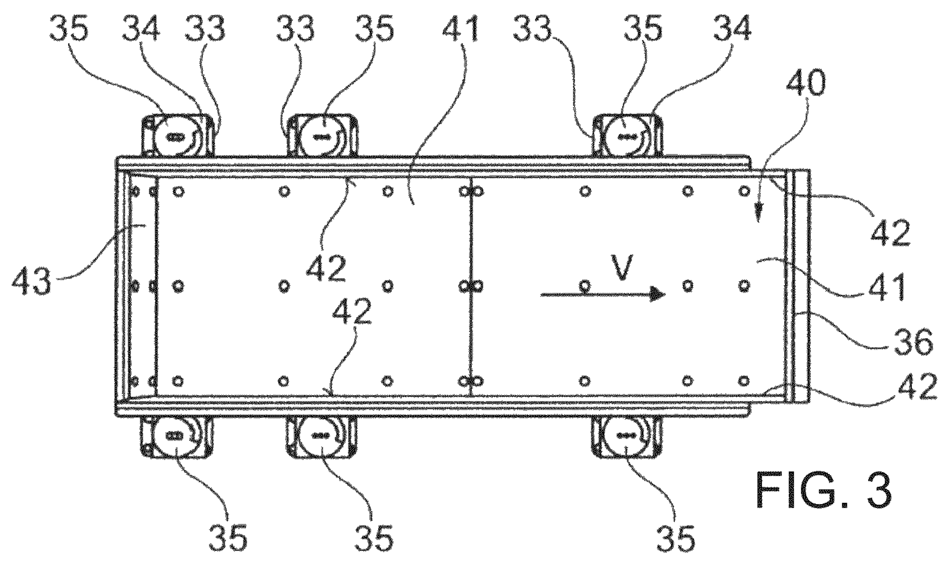
FIG. 3 shows a top view of the conveyor device shown in FIG. 2.

FIGS. 2 and 3 show an isolated partial representation of a part of the material feed device 9, namely the conveyor arrangement. As these illustrations show, the conveyor arrangement has a chute support 30. The chute support 30 has a bottom 32 and side walls 31 laterally connected to the bottom 32 and rising therefrom. The bottom 32 and/or the side walls 31 can be completely or partially covered with wear-resistant inserts 40. The wear-resistant insert 40 can be formed from wear plates, which form a bottom 41 and/or side walls 42 and a rear wall 43. These wear plates of the wear-resistant insert 40 completely or partially cover the bottom 32 and the side walls 31 of the chute support 30.

Bracing ribs 33 can be provided in the lateral area and/or the underside of the conveyor arrangement. The bracing ribs 33 can preferably be designed such that they reach under the bottom 32 and also at least partially extend along the side walls 31. Preferably, the bracing ribs 33 are welded both to the bottom 32 and to the side walls 31. FIG. 2 clearly shows that two adjacent bracing ribs 33 can be interconnected to form a U-shape.

The two adjacent bracing ribs 33 are connected to a flange 34. This flange 34 is used for coupling a vibration element 35, which may be formed by a spring, for instance. The material feed device 9 is directly or indirectly supported relative to the chassis 1.1 by means of the vibration elements 35.

The conveying direction V is marked, for instance, in FIG. 3 and extends along the bottom 32 from the rear wall 43 of the conveyor arrangement to a bridging piece 36 located at the end of the conveyor arrangement, which transitions the conveyor chute to the screener unit 3.

A partial fraction of the material to be comminuted is screened out at the upper screen deck 3.1. This partial fraction already has a sufficient particle size that it no longer needs to be comminuted in the material processing plant 1. In this respect, this screened out partial fraction can be routed past the crusher unit 10 through a bypass channel 3.5.

If a second screen deck 3.2 is used in the screen unit 3, a further fine particle fraction can be screened out from the partial fraction that accumulates below the screen deck 3.1. This fine particle fraction can be routed to a lateral discharge conveyor 3.4 below the screen deck 3.2. The fine particle fraction is diverted from the lateral discharge conveyor 3.4 and conveyed to a rock pile 7.2 located laterally of the machine.

As FIG. 1 illustrates, the screen unit 3 may be a vibrating screen having a screen drive 3.3. The screen drive 3.3 causes the screen deck 3.1 and/or the screen deck 3.2 to vibrate. Owing to the inclined arrangement of the screen decks 3.1, 3.2 and in conjunction with the vibration motions, material on the screen decks 3.1, 3.2 is transported towards the crusher unit 10 or towards the bypass channel 3.5.

The material to be comminuted routed from the screen deck 3.1 is routed to the crusher unit 10, as shown in FIG. 1.

The crusher unit 10 may, for instance, take the form of a rotary impact crusher unit or a jaw crusher unit. If a rotary impact crusher unit is used, as in FIG. 1, it has, for instance, an impact rotor 11, which is driven by a motor/engine, in particular by an internal combustion engine 12. In FIG. 1, the axis of rotation 17 of the impact rotor 11 is horizontal in the direction of the image depth. The impact rotor 11 is housed in a crushing chamber 16.1.

If a jaw crusher unit is used, two crushing jaws, which enclose a converging crushing shaft between them, which leads to a crushing gap, are positioned facing each other. At least one of the crushing jaws can be driven by the engine 12 to crush the material to be crushed filled in the converging crushing gap 15.

For instance, the outer periphery of the impact rotor 11 may be equipped with impact bars 11.2. Opposite from the impact rotor 11, for instance, wall elements may be disposed, preferably in the form of impact rockers 20. When the impact rotor 11 is rotating, the impact bars 11.2 throw the material to be comminuted outwards. In so doing, this material hits the impact rockers 20 and is comminuted due to the high kinetic energy. When the material to be comminuted is of sufficient particle size to allow the material particles to pass through a crushing gap 15 between the impact rockers 20 and the radially outer ends of the impact bars 11.2, the comminuted material exits the crusher unit 10 through the crusher outlet 16.

It is conceivable that in the area of the crusher outlet 16, the comminuted material routed from the crusher unit 10 is combined with the material routed from the bypass channel 3.5 and transferred onto a belt conveyor 1.3. The belt conveyor 1.3 can be used to convey the material out of the working area of the crusher unit 10.

As shown in the drawings, the belt conveyor 1.3 may comprise an endless circulating conveyor belt having a slack side 1.6 and a tight side 1.7. The slack side 1.6 is used to catch and transport away the crushed material falling from the crusher outlet 16 of the crusher unit 10. At the belt ends, deflection rollers 1.4 can be used to deflect the conveyor belt from the slack side 1.6 to the tight side 1.7 and vice versa. Guides, in particular support rollers, can be provided in the area between the deflection rollers 1.4 to change the direction of conveyance of the conveyor belt, to shape the conveyor belt in a certain way and/or to support the conveyor belt.

The belt conveyor 1.3 has a belt drive, which can be used to drive the belt conveyor 1.3. The belt drive can preferably be disposed at the discharge end 1.9 or in the area of the discharge end 1.9 of the belt conveyor 1.3.

The belt conveyor 1.3 can be connected, for instance by means of the belt drive, to a control device by means of a control line.

One or more further belt conveyors 6 and/or a return conveyor 8 may be used, which in principle have the same design as the belt conveyor 1.3. In this respect, reference can be made to the above statements.

A magnet 1.8, in particular an electric magnet, can be disposed in particular a, above the slack side 1.6 in the area between the feed end and the discharge end 1.9. The magnet 1.8 can be used to lift iron parts from the broken material and move them out of the conveying area of the belt conveyor 1.3.

A re-screening device 5 can be disposed downstream of the belt conveyor 1.3. The crusher unit 5 has a screen housing 5.1, in which at least one screen deck 5.2 is mounted. Below the screen deck 5.2, a housing base 5.3 is formed, which is used as a collection space for the material screened out at the screen deck 5.2.

An opening in the lower housing part 5.3 creates a spatial connection to the further belt conveyor 6. Here, the further belt conveyor 6 forms its feed area 6.1, wherein the screened material in the feed area 6.1 is directed onto the slack side of the further belt conveyor 6. The further belt conveyor 6 conveys the screened material towards its discharge end 6.2. From there, the screened material is transferred to a rock pile 7.1.

The material not screened out at the screen deck 5.2 of the re-screening device 5 is conveyed from the screen deck 5.2 onto a branch belt 5.4. The branch belt 5.4 can also be designed as a belt conveyor, i.e., reference can be made to the explanations given above with respect to the belt conveyor 1.3. In FIG. 1, the transport direction of the branch belt 5.4 extends in the direction of the image depth.

At its discharge end, the branch belt 5.4 transfers the un-screened material, also referred to as oversize material, to a feed area 8.1 of the return conveyor 8. The return conveyor 8, which may be a belt conveyor, conveys the oversize material towards the feed hopper 2. At its discharge end 8.2, the return conveyor 8 transfers the oversize material into the material flow, in particular into the material feed area. The oversize material can therefore be returned to the crusher unit 10 and crushed to the desired particle size.

Figure 4:
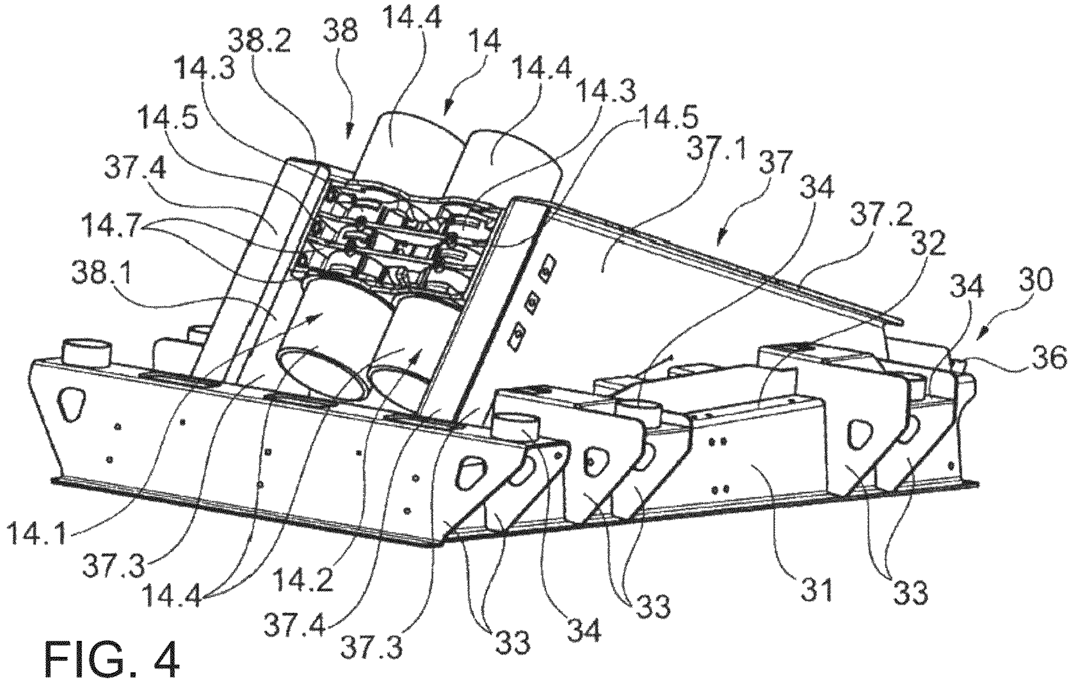
FIG. 4 shows a perspective view from below of a further design variant of a conveyor device for a material processing plant.
Figure 5:
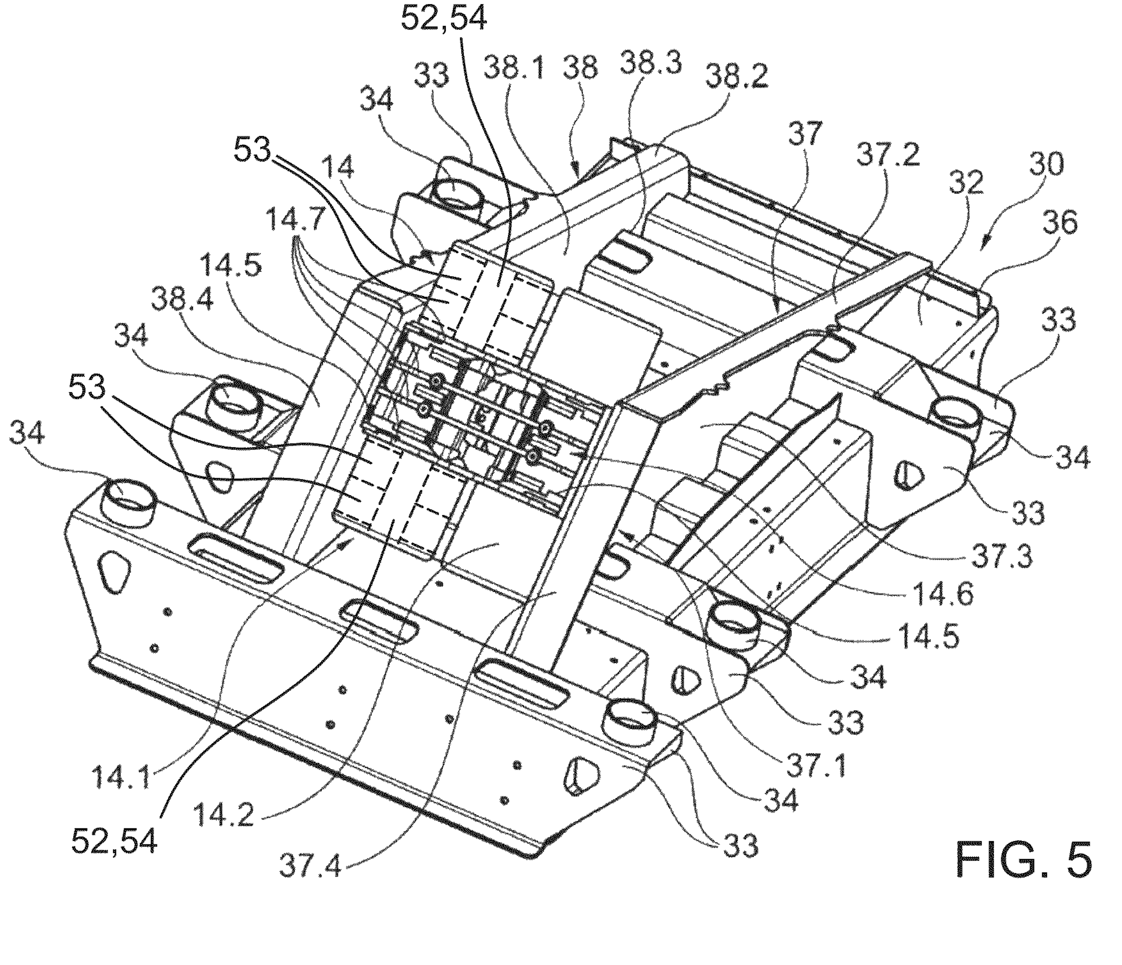
FIG. 5 shows the representation in of FIG. 4 from a different perspective.

FIGS. 4 and 5 show a further embodiment of a conveyor device according to the disclosure. Identical components are provided with the same reference signs, such that reference can be made to the above explanations and only the differences are explained in more detail below.

As the drawings show, the conveyor arrangement of the conveyor device again has a chute support 30 having a bottom 32 and side walls 31 connected thereto. The bottom 32 is underpinned by bracing ribs 33, which extend laterally beyond the bottom 32. The bracing ribs 33 are joined pairwise by flanges 34, wherein the flanges 34 provide attachment points for the vibration elements 35.

The drawings also show that the holders 37 and 38 are attached to the bottom 32. These holders 37, 38 each have one retaining section 37.1, 38.1, respectively. These retaining sections 37.1, 38.1 connect the holders 37, 38 to the chute support 30. The holders 37, 38 are designed as sheet metal parts. Opposite from the holding section 37.1, 38.1, folded edges 37.2, 38.2 close off the holders 37, 38. The folded edges 37.2, 38.2 can either be bent in one piece from the retaining section 37.1, 38.1 or it is conceivable that the folded edges 37.2, 38.2 are manufactured as separate sheet metal parts and welded to the retaining section 37.1, 38.1. The retaining sections 37.1 and 38.1 may be referred to as sheet metal walls 37.1 and 38.1.

Preferably, the folded edges 37.2, 38.2 are flared outwards in opposite directions, as shown in FIG. 5. A stiffener 37.4, 38.4 is used at its front-end area in the conveying direction V (this is the left-hand side in FIG. 4), which is connected, preferably integrally connected, to the holding sections 37.1, 38.1. The stiffener 37.4, 38.4 can also be designed in the form of a folded edge. Preferably, a stiffener 37.4, 38.4 meets a longitudinal end of the assigned folded edge 37.2, 38.2 at one of its longitudinal ends. These two components can then be joined together, preferably welded, to achieve improved rigidity.

The two holders 37, 38 protrude spaced apart on the underside of the conveyor arrangement and form part of a support device. The vibration exciter 14 shown in FIGS. 4 and 5 can be attached to this support device.

The vibration exciter 14 can be designed in such a way that it has a motor housing 14.3. The motor housing 14.3 has two housing parts, each of which houses one exciter motor 50 (see FIG. 7, for instance).

The exciter motors 50 can be designed as electric motors and have a motor stator 51 and a motor rotor 52. Preferably, the electric motor is designed as an internal rotor motor. The motor rotor 52 is mounted to rotate about an axis of rotation R1, R2.

The two exciter motors 50 each drive a shaft 54 independently of each other, which shaft 54 projects in the direction of the axis of rotation R1, R2 beyond the motor stator 51. The shaft 54 is a part of the motor rotor 52. It is also conceivable, as schematically shown in dashed lines in FIG. 5, that the exciter motor 50 drives two shafts 54, each of which protrudes at opposite ends beyond the motor stator 51. The shaft or shafts 54 each bear at least one imbalance mass 53, such that the exciter motor 50 is arranged in the area between the imbalance masses 53.

As is also schematically shown in dashed lines in FIG. 5, each shaft 54 may carry two imbalance masses 53. To vary and set the amplitude of the exciter frequency, the two imbalance masses 53 can be adjusted relative to each other in the circumferential direction of the axis of rotation as also schematically shown in FIGS. 6 and 7.

Together with the imbalance mass(es) 53, every exciter motor 50 forms an exciter unit 14.1, 14.2 of the vibration exciter 14.

For reasons of operational safety, covers 14.4 can be used to cover the imbalance masses 53, which covers are connected to the motor housing 14.3.

FIGS. 4 and 5 show that the motor stators 51 are indirectly interconnected, namely via connecting elements 14.7 of the motor housing 14.3. The connecting elements 14.7 form bridging areas that bridge the distance or distance area between the motor stators 51, at least sectionally.

The motor housing 14.3 can preferably be designed such that it has fastening sections 14.5 on opposite ends. The fastening sections 14.5 can form fastening flanges, for instance. The holders 37, 38 have fastening areas at the ends of the holding sections 37.1, 38.1 facing each other, to which fastening areas the fastening sections 14.5 and thus the motor housing 14.3 are connected.

FIGS. 4 and 5 show that it is advantageous for the two exciter units 14.1, 14.2 to be protected in the area between the holders 37, 38.

Figure 7:
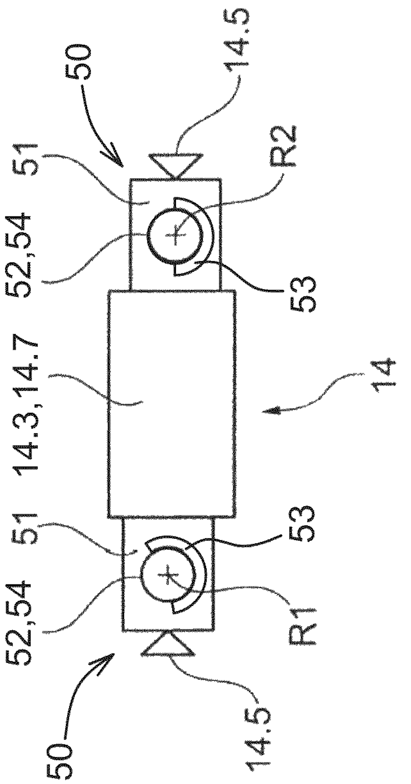
FIGS. 6 and 7 show schematic representations of possible design variants of exciter units for the conveyor devices according to FIGS. 2 to 5.

The design shown in FIGS. 4 and 5 is shown again schematically in FIG. 7. As this diagram illustrates, preferably the motor stators 51 of the two exciter motors 50 may be spaced apart. The area between the two motor stators 51 is bridged by a connecting element 41.7. The connecting section 14.7 is either directly or indirectly connected to the motor stators 51. Preferably, as mentioned above, the connecting section 14.7 may be part of a housing, in particular of a motor housing 14.3, which interconnects the motor stators 51. The exciter unit 14 shown in FIG. 7 thus essentially matches the structure of the exciter unit 14 as shown in FIGS. 4 and 5.

Figure 6:
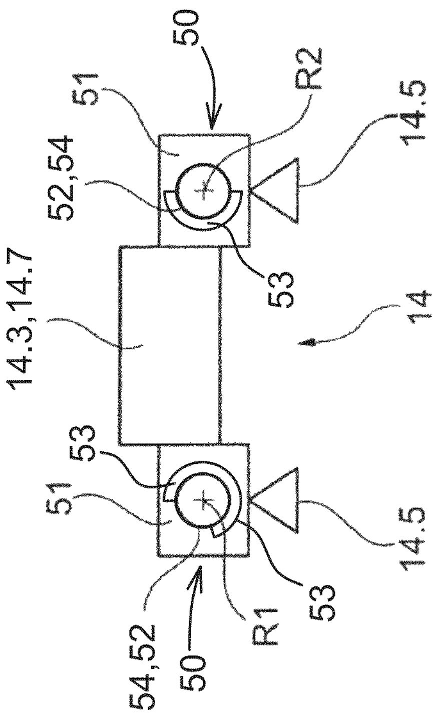

FIG. 6 shows an alternative structure of an exciter unit 14. As this diagram illustrates, two exciter motors 50 are again used, each having a motor stator 51 and a motor rotor 52. A fastening section 14.5 is directly or indirectly coupled to the motor stator 51. The spaced-apart motor stators 51 are connected directly or indirectly by means of the fastening section 14.7.

As FIG. 6 shows, in contrast to FIG. 7, the exciter unit 14 is not enclosed between the fastening sections 14.5 (see FIG. 7), but the two fastening sections 14.5 are arranged in the area of one end of the exciter unit 14. In this exemplary embodiment, the fastening sections 14.5 can thus be jointly connected to a plate of a correspondingly designed support of the support arrangement. It is also conceivable here that the two fastening sections 14.5 are combined to form a uniform fastening section 14.5.

The invention claimed is:

1. A conveyor device for a material processing plant, comprising:

a conveyor section;

a support device coupled to the conveyor section;

a vibration exciter mounted on the support device and including first and second exciter units, each exciter unit including an exciter motor including a motor stator and a motor rotor, the motor rotor having an axis of rotation, and each exciter unit including at least one imbalance mass driven by the motor rotor;

at least one fastening section configured to fasten the first and second exciter units to the support device for vibration transmission from the first and second exciter units to the support device and to the conveyor section; and at least one connecting element interconnecting the motor stators of the exciter motors, the at least one connecting element including a bridging area bridging a distance between the motor stators.

2. The conveyor device of claim 1, wherein:
at least one of the motor rotors has an axis of rotation arranged at least partially between the fastening section and the bridging area.

3. The conveyor device of claim 1, wherein:
the bridging area is arranged at least partially between the axes of rotation of the motor rotors of the first and second exciter units.

4. The conveyor device of claim 1, wherein:
the at least one fastening section includes first and second fastening sections configured to fasten the first and second exciter units to the support device for vibration transmission; and
the axes of rotation of the motor rotors of the first and second exciter units are arranged between the first and second fastening sections.

5. The conveyor device of claim 1, wherein:
the at least one imbalance mass driven by the motor rotor of at least one of the first and second exciter units includes two imbalance masses arranged spaced apart in a direction of the axis of rotation of the motor rotor.

6. The conveyor device of claim 5, wherein:
a projection of the bridging area of the at least one connecting element into a plane including the axes of rotation of the motor rotors is arranged at least partially between the two spaced apart imbalance masses.

7. The conveyor device of claim 1, wherein:
the exciter motors of the first and second exciter units are electric motors, each of which independently drives the at least one imbalance mass of its respective exciter unit.

8. The conveyor device of claim 1, wherein:
the at least one connecting element is part of a housing at least partially receiving the exciter motors of the first and second exciter units.

9. The conveyor device of claim 8, wherein:
the housing is configured to absorb forces generated by the at least one imbalance mass of both of the first and second exciter units.

10. The conveyor device of claim 1, wherein:
the support device includes first and second spaced apart holders;
the at least one fastening section includes first and second fastening sections; and
the first and second exciter units are arranged at least partially between the first and second spaced apart holders, and the first and second exciter units are fastened to the first and second spaced apart holders by the first and second fastening sections, respectively.

11. The conveyor device of claim 10, wherein:
the first and second fastening sections include first and second fastening flanges, respectively, the first and second fastening flanges facing away from each other and being fastened to the first and second spaced apart holders, respectively.

12. The conveyor device of claim 10, wherein:
the conveyor section includes a conveyor chute including a bottom, the conveyor chute having a conveying direction;
the first and second spaced apart holders include first and second coupling pieces, respectively, coupled to the bottom of the conveyor chute, the first and second coupling pieces being spaced apart transversely to the conveying direction.

13. The conveyor device of claim 10, wherein:
the first and second spaced apart holders are formed from sheet metal and each include a folded edge facing away from the conveyor section.

14. The conveyor device of claim 1, wherein:
the conveyor section includes a chute support including a bottom, the support device being connected to the bottom of the chute support; and
the conveyor device further includes a plurality of vibration elements configured to support the conveyor device on a chassis of the material processing plant.

15. The conveyor device of claim 1, wherein:
the at least one connecting element includes a plurality of connecting elements configured as spaced apart ribs extending between the motor stators.

16. The conveyor device of claim 1, wherein:
the at least one imbalance mass driven by the motor rotor of at least one of the first and second exciter units includes two imbalance masses configured to be adjusted relative to each other in a circumferential direction about an axis of rotation of the motor rotor.

17. A conveyor device for a material processing plant, comprising:
a conveyor chute including a bottom and having a conveying direction;
first and second holders including first and second sheet metal walls, respectively, spaced apart transversely to the conveying direction, the first and second sheet metal walls being coupled to the bottom of the conveyor chute;
first and second vibration exciter units located between the first and second sheet metal walls, each exciter unit including an exciter motor including a motor stator and a motor rotor, and each exciter unit including at least one imbalance mass driven by the motor rotor;
at least one connecting element interconnecting the motor stators of the exciter motors; and
first and second fastening sections fastening the first and second exciter units to the first and second holders, respectively, for vibration transmission from the first and second exciter units to the first and second holders, the first and second fastening sections including first and second fastening flanges, respectively, the first and second fastening flanges facing away from each other and being fastened to the first and second spaced apart sheet metal walls, respectively.

18. The conveyor device of claim 17, wherein:
the first and second spaced apart holders each include a folded edge on an edge of the sheet metal wall located away from the bottom of the conveyor chute.

19. The conveyor device of claim 17, wherein:
the at least one connecting element is part of a housing at least partially receiving the exciter motors of the first and second exciter units.

20. The conveyor device of claim 19, wherein:
the housing is configured to absorb forces generated by the at least one imbalance mass of both of the first and second exciter units.

* * * * *